(12) United States Patent
Shiraga et al.

(10) Patent No.: US 10,468,655 B2
(45) Date of Patent: Nov. 5, 2019

(54) NONAQUEOUS ELECTROLYTE SECONDARY BATTERIES

(71) Applicant: SANYO Electric Co., Ltd., Daito-shi, Osaka (JP)

(72) Inventors: Ayano Shiraga, Osaka (JP); Kazuhiro Hasegawa, Hyogo (JP); Akira Nagasaki, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/773,397

(22) PCT Filed: Nov. 9, 2016

(86) PCT No.: PCT/JP2016/004839
§ 371 (c)(1),
(2) Date: May 3, 2018

(87) PCT Pub. No.: WO2017/085918
PCT Pub. Date: May 26, 2017

(65) Prior Publication Data
US 2018/0323419 A1  Nov. 8, 2018

(30) Foreign Application Priority Data

Nov. 19, 2015  (JP) .................................. 2015-226171

(51) Int. Cl.
*H01M 2/26* (2006.01)
*H01M 2/02* (2006.01)
(Continued)

(52) U.S. Cl.
CPC ............. *H01M 2/26* (2013.01); *H01M 2/022* (2013.01); *H01M 2/023* (2013.01); *H01M 2/024* (2013.01);
(Continued)

(58) Field of Classification Search
CPC .......... H01M 2/26; H01M 2/022; H01M 2/08; H01M 2/024; H01M 4/133; H01M 4/587;
(Continued)

(56) References Cited

U.S. PATENT DOCUMENTS

2009/0317712 A1  12/2009  Kim et al.

FOREIGN PATENT DOCUMENTS

| JP | 6-314563 A | 11/1994 |
|---|---|---|
| JP | 11-233148 A | 8/1999 |

(Continued)

OTHER PUBLICATIONS

International Search Report dated Feb. 7, 2017, issued in counterpart International Application No. PCT/JP2016/004839 (2 pages).

*Primary Examiner* — Osei K Amponsah
(74) *Attorney, Agent, or Firm* — Westerman, Hattori, Daniels & Adrian, LLP

(57) ABSTRACT

A nonaqueous electrolyte secondary battery according to one aspect of the present invention includes an electrode assembly including a negative electrode plate and a positive electrode plate wound together via a separator; a nonaqueous electrolyte; a bottomed cylindrical exterior case accommodating the electrode assembly and the nonaqueous electrolyte; and a sealing member sealing an open end of the exterior case.

8 Claims, 2 Drawing Sheets

(51) Int. Cl.
  *H01M 2/08* (2006.01)
  *H01M 10/0587* (2010.01)
  *H01M 4/36* (2006.01)
  *H01M 4/587* (2010.01)
  *H01M 4/48* (2010.01)
  *H01M 4/133* (2010.01)
  *H01M 4/134* (2010.01)
  *H01M 4/38* (2006.01)
  *H01M 4/62* (2006.01)
  *H01M 10/052* (2010.01)

(52) U.S. Cl.
  CPC ............ *H01M 2/08* (2013.01); *H01M 4/133* (2013.01); *H01M 4/134* (2013.01); *H01M 4/366* (2013.01); *H01M 4/386* (2013.01); *H01M 4/483* (2013.01); *H01M 4/587* (2013.01); *H01M 4/625* (2013.01); *H01M 10/0587* (2013.01); *H01M 10/052* (2013.01); *Y02E 60/122* (2013.01); *Y02T 10/7011* (2013.01)

(58) Field of Classification Search
  CPC ... H01M 4/483; H01M 4/366; H01M 10/0587
  See application file for complete search history.

(56) References Cited

FOREIGN PATENT DOCUMENTS

| | | |
|---|---|---|
| JP | 2005-149986 A | 6/2005 |
| JP | 2007-220601 A | 8/2007 |
| JP | 2007-273258 A | 10/2007 |
| JP | 2010-3686 A | 1/2010 |
| JP | 2010-212228 A | 9/2010 |
| JP | 2013-16328 A | 1/2013 |
| WO | 2012/147425 A1 | 11/2012 |
| WO | 2013/038676 A1 | 3/2013 |

NONAQUEOUS ELECTROLYTE SECONDARY BATTERIES

TECHNICAL FIELD

The present invention relates to a nonaqueous electrolyte secondary battery which has a current collection structure suited for high-output applications.

BACKGROUND ART

Nonaqueous electrolyte secondary batteries have recently gained wide use as power supplies for driving mobile electronic devices such as smartphones, tablet computers, laptop computers and portable music players. The use of nonaqueous electrolyte secondary batteries also expands to electric tools, power-assisted bicycles, electric vehicles and the like. There has been thus a demand that nonaqueous electrolyte secondary batteries have an increased output.

An electrode plate of a nonaqueous electrolyte secondary battery has an active material layer disposed on a current collector composed of a metal foil, and part of the electrode plate is defined by an exposed portion of the current collector free from the active material layer. A lead is connected to the exposed portion of the current collector so as to establish a current path between the electrode plate and an external terminal. Nonaqueous electrolyte secondary batteries use a nonaqueous electrolyte which has lower ion conductivity than aqueous solutions. To enhance output characteristics, electrode plates used in nonaqueous electrolyte secondary batteries are made thin and long. Thin and long electrode plates make it possible to obtain excellent output characteristics because the current density per unit area of the electrode plate is reduced and the length of the current path in the direction of the thickness of the active material layer is short.

However, an elongated electrode plate has an increased length to the lead in some regions, and consequently the current collection resistance of the electrode plate is increased. To ensure that a thin and long electrode plate will fully exhibit output characteristics, it is necessary to reduce the current collection resistance by optimizing the number of leads and the positions to which the leads are connected. Patent Literature 1 discloses a nonaqueous electrolyte secondary battery in which a plurality of leads are connected to an electrode plate in accordance with the length and width of the electrode plate and the thickness of a current collector. Patent Literatures 2 and 3 disclose nonaqueous electrolyte secondary batteries in which negative electrode leads are connected to both ends of a negative electrode plate in the longitudinal direction.

CITATION LIST

Patent Literature

PTL 1: Japanese Published Unexamined Patent Application No. 11-233148
PTL 2: Japanese Published Unexamined Patent Application No. 2007-273258
PTL 3: Japanese Published Unexamined Patent Application No. 2013-16328

SUMMARY OF INVENTION

Technical Problem

A negative electrode lead is connected to the bottom of an exterior case that functions as a negative electrode external terminal. When two negative electrode leads are connected to a negative electrode plate as described in Patent Literatures 2 and 3, the negative electrode leads are overlapped one on the other on the end face of the electrode assembly, and the overlapped portion is connected to the bottom of an exterior case by resistance welding. It is necessary that the resistance welding not only join the bottom of the exterior case and the immediately adjacent negative electrode lead, but also produce a weld between the negative electrode leads. The weld strength between, the negative electrode leads is often lower than the weld strength between the negative electrode lead and the bottom of the exterior case. Thus, there is a risk that the weld between the negative electrode leads will rapture to cause a decrease in output characteristics when the nonaqueous electrolyte secondary battery is subjected to external vibrations or impacts. The weld strength between negative electrode leads can be increased by applying a higher magnitude of current during resistance welding. However, resistance welding at a higher magnitude of current tends to give rise to problems such as sputtering or damages to the bottom of the exterior case, possibly resulting in a decrease in the productivity of nonaqueous electrolyte secondary batteries.

The present invention has been made in light of the circumstances described above. It is therefore an object of the invention to provide a nonaqueous electrolyte secondary battery which has a current collection structure suited for high-output applications and is resistant to a decrease in output characteristics even when subjected to external vibrations or impacts.

Solution to Problem

A nonaqueous electrolyte secondary battery according to one aspect of the present invention includes an electrode assembly including a negative electrode plate and a positive electrode plate wound together via a separator wherein the negative electrode plate includes a negative electrode current collector and a negative electrode active material layer disposed on the negative electrode current collector, and the positive electrode plate includes a positive electrode current collector and a positive electrode active material layer disposed on the positive electrode current collector; a nonaqueous electrolyte; a bottomed cylindrical exterior case accommodating the electrode assembly and the nonaqueous electrolyte; and a sealing member sealing an open end of the exterior case. The negative electrode plate has a first exposed portion of the negative electrode current collector and a second exposed portion of the negative electrode current collector which are exposed from the negative electrode active material layer on a coiling start end and on a coiling finish end, respectively, and at least part of the second exposed portion of the negative electrode current collector is in contact with an inner face of a sidewall of the exterior case. A first negative electrode lead and a second negative electrode lead are joined to the first exposed portion of the negative electrode current collector and to the second exposed portion of the negative electrode current collector, respectively. The first negative electrode lead and the second negative electrode lead each lead out from one end face of the electrode assembly toward a bottom of the exterior case. The first negative electrode lead is joined to the bottom of the exterior case, and the second negative electrode lead is joined to the first negative electrode lead.

Advantageous Effects of Invention

According to one aspect of the present invention, both ends of the negative electrode plate in the longitudinal direction are electrically connected, through the first negative electrode lead and the second negative electrode lead, to the exterior case that functions as a negative electrode external terminal. With this configuration, the nonaqueous electrolyte secondary battery attains excellent output characteristics. Even if the relatively weak joint between the first negative electrode lead and the second negative electrode lead ruptures, the first negative electrode lead joined to the coiling start end of the negative electrode plate remains joined to the bottom of the exterior case. Although the second negative electrode lead joined to the coiling finish end of the negative electrode plate loses its electrical connection to the exterior case, the second exposed portion of the negative electrode current collector disposed on the coiling finish end of the negative electrode plate remains in contact with the inner face of the sidewall of the exterior case. That is, an electrical connection between both ends of the negative electrode plate and the exterior case is ensured even if the joint between the first negative electrode lead and the second negative electrode lead has ruptured. Thus, the nonaqueous electrolyte secondary battery provided according to one aspect of the present invention is resistant to a decrease in output characteristics even when it is subjected to external vibrations or impacts.

DESCRIPTION OF EMBODIMENTS

Embodiments for carrying out the present invention will be described in detail with reference to the drawings. The present invention is not limited to those embodiments described below, and various modifications are possible without departing from the spirit of the invention.

Figure 1:
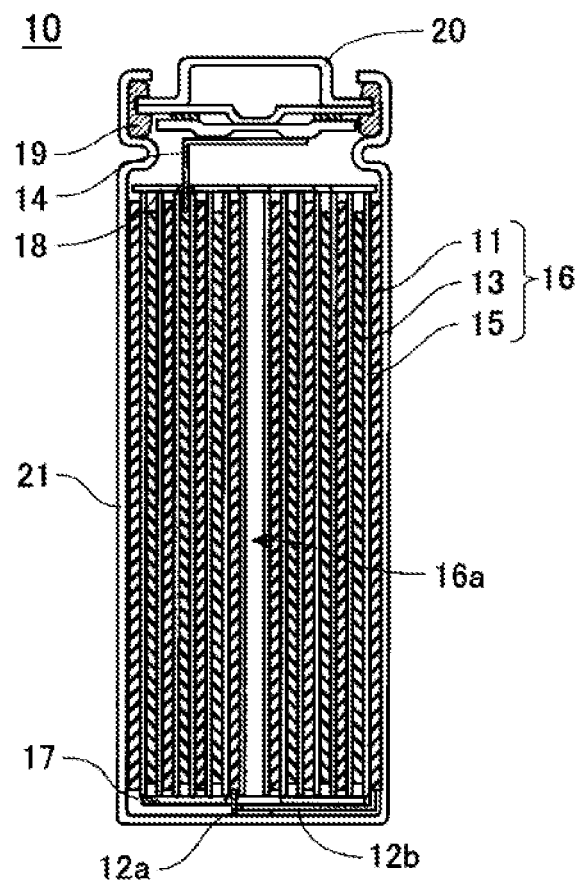
FIG. 1 is a sectional view of a nonaqueous electrolyte secondary battery according to an embodiment of the present invention.

FIG. 1 is a sectional view of a nonaqueous electrolyte secondary battery 10 representing an embodiment of the present invention. An electrode assembly 16 and a nonaqueous electrolyte are accommodated in a bottomed cylindrical exterior case 21. The open end of the exterior case 21 is crimped so that a sealing member 20 is fastened on a groove disposed near the open end through a gasket 19. The inside of the battery is thus sealed.

Figure 2:
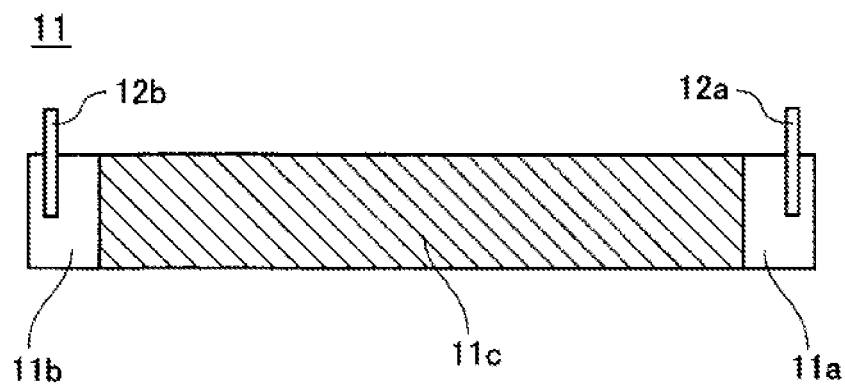
FIG. 2 is a plan view of a negative electrode plate according to an embodiment of the present invention.

As illustrated in FIG. 2, a negative electrode plate 11 has a negative electrode active material layer 11c disposed on a negative electrode current collector. The negative electrode active material layer 11c is preferably disposed on both sides of the negative electrode current collector. The negative electrode plate 11 has a first exposed portion 11a of the negative electrode current collector and a second exposed portion 11b of the negative electrode current collector which are disposed at both ends in the longitudinal direction. In the first and the second exposed portions 11a and 11b of the negative electrode current collector, there are no negative electrode active material layers on both sides of the negative electrode current collector. The first and the second exposed portions 11a and 11b of the negative electrode current collector may have different lengths on the front and the back of the negative electrode plate 11. A first negative electrode lead 12a and a second negative electrode lead 12b are joined to the first exposed portion 11a of the negative electrode current collector and the second exposed portion 11b of the negative electrode current collector, respectively. The first and the second negative electrode leads 12a and 12b may be joined to any of the front and the back of the negative electrode current collector. Examples of the methods for joining the first and the second negative electrode leads 12a and 12b include welding methods such as resistance welding, ultrasonic welding and laser welding, and a thrust-and-press clamping method. While FIG. 2 illustrates the negative electrode current collector as being completely exposed at both ends of the negative electrode plate 11 in the longitudinal direction, it is acceptable that a negative electrode active material layer having no contribution to the charging and discharging reactions is present on the negative electrode current collector without impairing the joining of the first and the second negative electrode leads 12a and 12b.

The negative electrode active material layer 11c may be formed by applying a negative electrode mixture slurry prepared by kneading a negative electrode active material and a binder in a dispersion medium, onto the negative electrode current collector, and drying the coating. It is preferable that the negative electrode active material layer lie after being dried be pressed with a roller so as to attain a predetermined thickness. By compressing the negative electrode active material layer 11c, the energy density of the nonaqueous electrolyte secondary battery may be enhanced.

The negative electrode active material may be a carbon material or a silicon material capable of storing and releasing lithium ions reversibly. Such a carbon material and a silicon material may be used singly or as a mixture. Because a silicon material has a large volume change associated with charging and discharging, the second exposed portion 11b of the negative electrode current collector that is disposed on the outermost periphery of the electrode assembly 16 can be reliably placed in contact with an inner face 21a of the sidewall of the exterior case 21. For this reason, the negative electrode active material preferably includes a silicon material. However, too large a volume change associated with charging and discharging gives rise to a risk that, for example, cycle characteristics may be decreased due to the separation of the negative electrode active material layer from the negative electrode current collector. Thus, it is preferable to use a silicon material in the form of a mixture with a carbon material.

Examples of the carbon materials include graphites such as natural graphites and artificial graphites. Examples of the silicon materials include silicon oxides, silicon alloys and lithium silicates. The silicon materials include silicon itself. From the point of view of the balance between capacity and cycle characteristics, the silicon oxide is preferably one represented by the general formula. $SiO_x$ ($0.5 \leq x < 1.6$). Examples of the silicon alloys include alloys of silicon with at least one metal element selected from the group consisting of nickel, iron, copper, titanium, tungsten and molybdenum. The lithium silicate is preferably one represented by the general formula $Li_{2y}SiO_{(2+y)}$ ($0<y<2$). Silicon may be used singly, or may be used as a composite with other material. Forming a composite of silicon with other material is expected to provide effects such as the lessening of the volume change of the negative electrode active material layer due to the expansion and shrinkage of silicon during charging and discharging, and the reduction in the irreversible capacity of the negative electrode. Example materials that will provide such effects are a carbon material and a lithium silicate. The silicon composite may be prepared by stirring a silicon powder with other powdery material in a high-velocity air, or by granulating the materials with use of a ball mill. The silicon and other material may be bound together by the use of a pitch as a binder or by sintering the granules. It is preferable that the surface of the silicon material be coated with a carbon material such as amorphous carbon. In this manner, the conductive properties of the silicon material is enhanced.

Examples of the negative electrode current collectors include metal foils formed of copper, copper alloys, nickel, nickel alloys and stainless steel. Of these, metal foils formed of copper and copper alloys are preferable. The first and the second negative electrode leads 12a and 12b are preferably metal plates that are made of any of the metals mentioned as examples of the negative electrode current collectors, and are more preferably nickel copper clad materials.

A positive electrode plate 13 has a positive electrode active material layer disposed on a positive electrode current collector. The positive electrode active material layer is preferably disposed on both sides of the positive electrode current collector. The positive electrode plate 13 has an exposed portion of the positive electrode current collector which is disposed in a central portion of the positive electrode plate in the longitudinal direction. A positive electrode lead 14 is joined to the exposed portion of the positive electrode current collector. Examples of the methods for forming the joint include welding methods such as resistance welding, ultrasonic welding and laser welding, and a thrust-and-press clamping method. By joining the positive electrode lead 14 to a central portion of the positive electrode plate 13, the current collecting efficiency of the positive electrode plate 13 may be increased. While the positive electrode lead 14 is preferably joined to a central portion of the positive electrode plate 13 in the longitudinal direction, the position to which the positive electrode lead 14 is joined is not limited to a central portion. It is preferable that an insulating tape be applied onto the positive electrode lead 14 and onto the back of the positive electrode current collector opposite to the positive electrode lead 14. In this manner, an internal short circuit ascribed to the positive electrode lead 14 can be prevented.

The positive electrode active material layer may be formed by applying a positive electrode mixture slurry prepared by kneading a positive electrode active material, a conductive agent and a binder in a dispersion medium, onto the positive electrode current collector, and drying the coating. It is preferable that the positive electrode active material layer after being dried be pressed with a roller so as to attain a predetermined thickness. By compressing the positive electrode active material layer, the energy density of the nonaqueous electrolyte secondary battery may be enhanced.

The positive electrode active material may be a lithium transition metal composite oxide capable of storing and releasing lithium ions reversibly. Examples of the lithium transition metal composite oxides include those represented by the general formulae $LiMO_2$ (M is at least one of Co, Ni and Mn), $LiMn_2O_4$ and $LiFePO_4$. These may be used singly, or two or more may be used in combination. At least one selected from the group consisting of Al, Ti, Mg and Zr may be added to the lithium transition metal composite oxide or may replace the transition metal element.

Examples of the positive electrode current collectors include metal foils formed of aluminum, aluminum alloys, nickel, nickel alloys and stainless steel. Of these, metal foils formed of aluminum and aluminum alloys are preferable. The positive electrode lead 14 may be a metal plate that is made of any of the metals mentioned as examples of the positive electrode current collectors.

Figure 3:
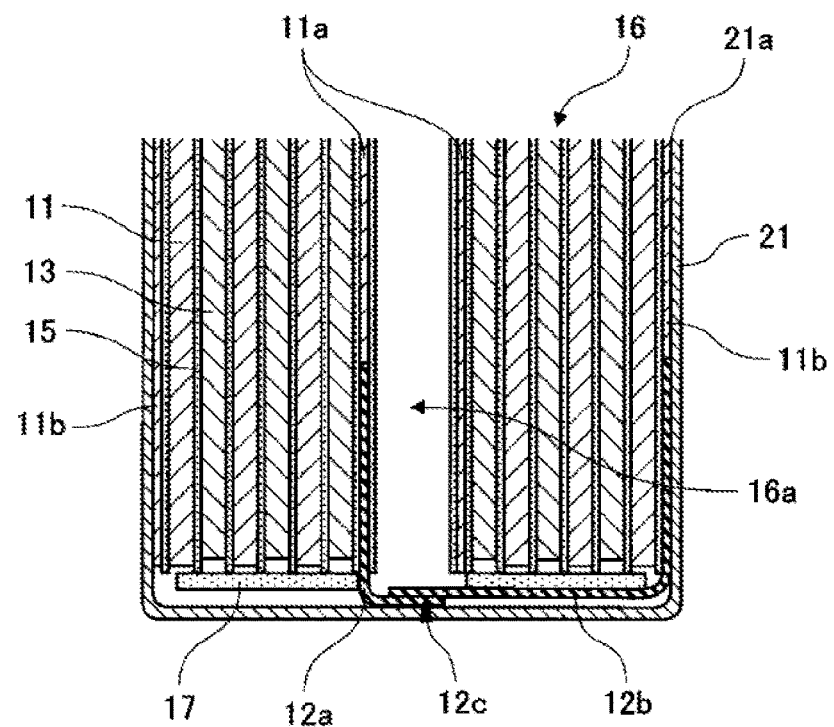
FIG. 3 is an enlarged sectional view of a connection between an overlapped portion of a first negative electrode lead and a second negative electrode lead, and the bottom of an exterior case, according to an embodiment of the present invention.

The electrode assembly 16 is fabricated by winding the negative electrode plate 11 and the positive electrode plate 13 through a separator 15. As illustrated in FIG. 3, an annular insulating plate 17 is disposed under the electrode assembly 16. The first negative electrode lead 12a and the second negative electrode lead 12b that lead out from the electrode assembly 16 are folded toward a hollow 16a of the electrode assembly 16 so as to form an overlapped portion 12c. The overlapped portion 12c is joined to the bottom of the exterior case 21. Examples of the methods for forming the joint include resistance welding and laser welding.

The bottomed cylindrical exterior case 21 may be fabricated by, for example, drawing a metal plate. Examples of the metals which may be used for the metal plates include iron, nickel and stainless steel. When iron is used, it is preferable that the surface thereof be plated with nickel.

The separator 15 may be a microporous membrane based on a polyolefin such as polyethylene (PE) or polypropylene (PP). A single microporous membrane or a stack of two or more of such membranes may be used. When the separator is a stack of two or more layers, it is preferable that a layer based on polyethylene (PE) having a low melting point be an intermediate layer, and polypropylene (PP) having excellent oxidation resistance be a surface layer. Inorganic particles such as aluminum oxide ($Al_2O_3$), titanium oxide ($TiO_2$) and silicon oxide ($SiO_2$) may be added to the separator. Such inorganic particles may be suspended in the separator, or may be applied together with a binder onto the surface of the separator. An aramid resin may be applied onto the surface of the separator.

The nonaqueous electrolyte may be a solution of a lithium salt as an electrolyte salt in a nonaqueous solvent.

Examples of the nonaqueous solvents include cyclic carbonate esters, chain carbonate esters, cyclic carboxylate esters and chain carboxylate esters. It is preferable that two or more kinds of solvents be used as a mixture. Examples of the cyclic carbonate esters include ethylene carbonate (EC), propylene carbonate (PC) and butylene carbonate (BC). The cyclic carbonate esters may be partially substituted with fluorine in place of hydrogen, with examples including fluoroethylene carbonate (FEC). Examples of the chain carbonate esters include dimethyl carbonate (DMC), ethyl methyl carbonate (EMC), diethyl carbonate (DEC) and methyl propyl carbonate (MPC). Examples of the cyclic carboxylate esters include γ-butyrolactone (γ-BL) and γ-valerolactone (γ-VL). Examples of the chain carboxylate esters include methyl pivalate, ethyl pivalate, methyl isobutyrate and methyl propionate.

Examples of the lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$ and $Li_2B_{12}Cl_{12}$. Of these, $LiPF_6$ is preferable. The concentration in the nonaqueous electrolytic solution is preferably 0.5 to 2.0 mol/L. $LiPF_6$ may be mixed with other lithium salts such as $LiBF_4$.

EXAMPLES

Hereinbelow, embodiments of the present invention will be described in more detail based on specific EXAMPLES.

Example 1

(Fabrication of Negative Electrode Plate)

97 Parts by mass of graphite as a negative electrode active material, 1.5 parts by mass of carboxymethylcellulose (CMC) as a thickener, and 1.5 parts by mass of styrene butadiene rubber as a binder were mixed together. The mixture was added to water as a dispersion medium. The resultant mixture was kneaded to give a negative electrode mixture slurry. The negative electrode mixture slurry was applied to both sides of an 8 μm thick negative electrode current collector made of copper by a doctor blade method. The coatings were dried to form negative electrode active material layers $11c$. During this process, portions of the negative electrode current collector were allowed to remain uncoated so that the negative electrode current collector would define a first exposed portion $11a$ and a second exposed portion $11b$ at both ends of the final negative electrode plate 11 in the longitudinal direction. Next, the negative electrode active material layers $11c$ were pressed with a roller, and the compressed electrode plate was cut to a predetermined size. Lastly, a first negative electrode lead $12a$ and a second negative electrode lead $12b$ each made of a cladded three-layer material Ni—Cu—Ni were joined to the first exposed portion $11a$ and the second exposed portion $11b$ of the negative, electrode current collector, respectively, by ultrasonic welding. A negative electrode plate 11 illustrated in FIG. 2 was thus fabricated.

(Fabrication of Positive Electrode Plate)

100 Parts by mass of $LiNi_{0.82}Co_{0.15}Al_{0.03}O_2$ as a positive electrode active material, 1 part by mass of acetylene black as a conductive agent, and 0.9 parts by mass of polyvinylidene fluoride (PVDF) as a binder were mixed together. The mixture was added to N-methyl-2-pyrrolidone (NMP) as a dispersion medium. The resultant mixture was kneaded to give a positive electrode mixture slurry. The positive electrode mixture slurry was applied to both sides of a 15 μm thick positive electrode current collector made of aluminum by a doctor blade method. The coatings were dried to form positive electrode active material layers. During this process, a portion of the positive electrode current collector was allowed to remain uncoated so that the positive electrode current collector would define an exposed portion at a central region of the final positive electrode plate 13. Next, the positive electrode active material layers were pressed with a roller, and the compressed electrode plate was cut to a predetermined size. Lastly, a positive electrode lead 14 made of aluminum was joined to the exposed portion of the positive electrode current collector by ultrasonic welding. A positive electrode plate 13 was thus fabricated.

(Fabrication of Electrode Assembly)

The negative electrode plate 11 and the positive electrode plate 13 were wound together through a separator 15 that was a microporous polyethylene membrane to form an electrode assembly 16. In the fabrication of the electrode assembly, the coiling operation started from the side having the first exposed portion $11a$ of the negative electrode current collector, and finished at the side having the second exposed portion $11b$ of the negative electrode current collector. After the electrode assembly 16 had been fabricated, the core was removed from the electrode assembly 16 to leave a hollow $16a$ at a position corresponding to the winding axis of the electrode assembly 16. The end of the coil of the electrode assembly 16 was fastened with a stopper tape.

(Preparation of Nonaqueous Electrolyte)

A nonaqueous solvent was prepared by mixing ethylene carbonate (EC), ethyl methyl carbonate (EMC) and dimethyl carbonate (DMC) in a volume ratio of 25:5:70 (1 atm, 25° C.). Lithium hexafluorophosphate ($LiPF_6$) as an electrolyte salt was dissolved into the nonaqueous solvent with a concentration of 1.4 mol/L. A nonaqueous electrolyte was thus prepared.

(Fabrication of Exterior Case)

A nickel-plated sheet was drawn into a bottomed cylindrical exterior case 21. The Mean arithmetic roughness (Ra) of an inner face $21a$ of the sidewall of the exterior case 21 was 1.4 μm. The mean arithmetic roughness (Ra) was measured by a method in accordance with JIS B 0601-2001.

(Fabrication of Nonaqueous Electrolyte Secondary Battery)

The first negative electrode lead $12a$ leading out from the vicinity of the hollow $16a$ of the electrode assembly 16 was inserted into the opening of an annular insulating plate 17, and the insulating plate 17 was attached to the bottom of the electrode assembly 16. The second negative electrode lead $12b$ leading out from the periphery of the electrode assembly 16 was folded toward the hollow $16a$ of the electrode assembly 16. Next, the first negative electrode lead $12a$ was folded toward the hollow $16a$ of the electrode assembly 16 so as to form an overlapped portion $12c$ illustrated in FIG. 3. The electrode assembly 16 was then inserted into the exterior case 21. The overlapped portion $12c$ was joined to the bottom of the exterior case 21 in the following manner. First, an electrode rod was inserted into the hollow $16a$ of the electrode assembly 16 and was brought into contact with the overlapped portion $12c$. Next, an electrode plate serving as the counter electrode for the electrode rod was brought into contact with the outside of the bottom of the exterior case 21. The overlapped portion $12c$ and the bottom of the exterior case 21 were resistance welded by passing a current of 1.4 kA between the electrode rod and the electrode plate. Consequently, one side of the first negative electrode lead $12a$ was joined to the bottom of the exterior case 21, and the other side of the first negative electrode lead $12a$ was joined to the second negative electrode lead $12b$.

Next, an insulating plate 18 was arranged on top of the electrode assembly 16. A disk that was being rotated was pressed against an outer lateral portion of the exterior case 21 to form a groove. A gasket 19 was arranged onto the groove, and a sealing member 20 was connected to the positive electrode lead 14. Next, the nonaqueous electrolyte was poured into the inside of the exterior case 21. The sealing member 20 was fastened on the groove of the exterior case 21 through the gasket 19 by crimping the open end. A cylindrical nonaqueous electrolyte secondary battery 10 illustrated in FIG. 1 was thus fabricated.

Examples 2 and 3

Nonaqueous electrolyte secondary batteries 10 of EXAMPLES 2 and 3 were fabricated in the same manner as in EXAMPLE 1, except that the mean arithmetic roughness (Ra) of the inner face $21a$ of the sidewall of the exterior case 21 was changed to a value described in Table 1. To change the mean arithmetic roughness (Ra) of the inner face $21a$ of the sidewall of the exterior case 21, the exterior case 21 was fabricated while controlling the number of drawing operations for the nickel-plated iron sheet and changing the jigs used for the drawing operations.

Examples 4 to 7

(Preparation of Negative Electrode Active Material

The surface of a silicon oxide which had a composition represented by SiO (corresponding to the general formula $SiO_x$ in which x=1) was coated with carbon by a chemical vapor deposition (CVD) method in which the SiO was heated in an argon atmosphere containing a hydrocarbon gas and the hydrocarbon gas was pyrolyzed. The amount of the carbon deposited was 10 mass % relative to the mass of the SiO. Next, the carbon-coated SiO particles were disproportionated in an argon atmosphere at 1000° C. to form fine Si phases and $SiO_2$ phases in the SiO particles. The particles were then classified to a predetermined grain size. SiO used for a negative electrode active material was thus prepared.

Nonaqueous electrolyte secondary batteries 10 of EXAMPLES 4 to 7 were fabricated in the same manner as in EXAMPLE 3, except that a mixture of graphite and the SiO prepared above was used as the negative electrode active material. The contents of SiO in the negative electrode active materials of EXAMPLES 4 to 7 are described in Table 1. The SiO contents shown in Table 1 are the percentages of SiO relative to the total mass of graphite and SiO.

Comparative Examples 1 and 2

Figure 4:
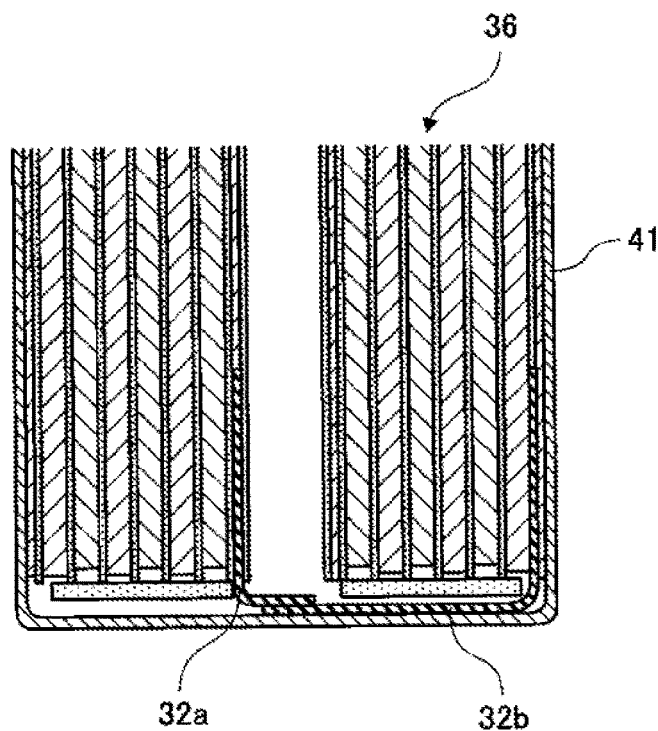
FIG. 4 is an enlarged sectional view of a connection between an overlapped portion of a first negative electrode lead and a second negative electrode lead, and the bottom of an exterior case, in COMPARATIVE EXAMPLE.

A nonaqueous electrolyte secondary battery of COMPARATIVE EXAMPLE 1 was fabricated in the same manner as in EXAMPLE 1, except that first and second negative electrode leads 32a and 32b leading out from an electrode assembly 36 were folded toward the hollow of the electrode assembly 36 in such a manner that the first negative electrode lead 32a was folded first and thereafter the second negative electrode lead 32b was folded. In the nonaqueous electrolyte secondary battery of COMPARATIVE EXAMPLE 1, as illustrated in FIG. 4, one side of the second negative electrode lead 32b was joined to the bottom of an exterior case 41, and the other side of the second negative electrode lead 32b was joined to the first negative electrode lead 32a, A nonaqueous electrolyte secondary battery of COMPARATIVE EXAMPLE 2 was fabricated in the same manner as in COMPARATIVE EXAMPLE 1, except that the value of current applied during the resistance welding was changed to 2.1 kA.
(Vibration Test)

The batteries of EXAMPLES and COMPARATIVE EXAMPLES were each subjected to a vibration test under the following conditions. The battery was fixed to a vibration tester so that the winding axis would lie in a horizontal direction. Vibrations were applied to the battery while logarithmically sweeping sinusoidal vibrations so that the frequency would change from 7 Hz→200 Hz→7 Hz in 15 minutes. The battery was caused to undergo a total of 12 cycles of vibrations by performing the above vibrating cycle 4 times in each of X-axis direction, Y-axis direction and Z-axis direction of the battery. The X-axis, the Y-axis and the Z-axis correspond to three space axes orthogonal to one another, one of which corresponds to the winding axis of the electrode assembly. The internal resistance (IR) of the battery was measured before and after the vibration test, and the increase in internal resistance (ΔIR) by the vibration test was calculated. The test results are described in Table 1. The increases in: internal resistance (ΔIR) shown in Table 1 are the averages of five batteries of each of EXAMPLES and COMPARATIVE EXAMPLES.

TABLE 1

| | Negative electrode lead immediately adjacent to bottom of exterior case | Current (kA) applied during resistance welding | SiO content (mass %) | Ra (μm) of inner face of sidewall of exterior case | ΔIR (mΩ) |
|---|---|---|---|---|---|
| EX. 1 | First negative electrode lead (coiling start end) | 1.4 | 0 | 1.4 | 0 |
| EX. 2 | | 1.4 | 0 | 1.2 | 0 |
| EX. 3 | | 1.4 | 0 | 1.6 | 8 |
| EX. 4 | | 1.4 | 1 | 1.6 | 5 |
| EX. 5 | | 1.4 | 2 | 1.6 | 3 |
| EX. 6 | | 1.4 | 4 | 1.6 | 0 |
| EX. 7 | | 1.4 | 6 | 1.6 | 0 |
| COMP. EX. 1 | Second negative electrode lead (coiling finish end) | 1.4 | 0 | 1.4 | 80 |
| COMP. EX. 2 | | 2.1 | 0 | 1.4 | 0 |

From Table 1, it has been shown that EXAMPLES 1 to 7 achieved significant suppression of the increase in internal resistance by the vibration test as compared to COMPARATIVE EXAMPLE 1. COMPARATIVE EXAMPLE 1 resulted in a considerable increase in internal resistance because the weld between the first negative electrode lead and the second negative electrode lead was prone to fracturing. After the weld between the first negative electrode lead and the second negative electrode lead had ruptured, the current flowed through an increased electrical resistance in the path between, the coiling start end of the negative electrode plate and the exterior case that functioned, as a negative electrode external terminal. In EXAMPLES 1 to 7, as illustrated in FIG. 3, the exterior case remained joined to the first negative electrode lead even after the weld between the first negative electrode lead and the second negative electrode lead had ruptured, and therefore the current path between the coiling start end of the negative electrode plate and the exterior case was maintained. Further, the second exposed portion of the negative electrode current collector that was disposed at the coiling finish end of the electrode assembly was in contact with the inner face of the sidewall of the exterior case, and therefore the current path between the coiling finish end of the negative electrode plate and the exterior case was ensured.

While the value of current applied during the resistance welding was 1.4 kA in EXAMPLES 1 to 7 and COMPARATIVE EXAMPLE 1, the results of COMPARATIVE EXAMPLE 2 have shown that the increase in internal resistance by the vibration test was suppressed by changing the current value to 2.1 kA. However, resistance welding at an excessively high current causes production problems such as the occurrence of sputtering and damages to the bottom of the exterior case. Because one embodiment of the present invention demonstrated in EXAMPLES 1 to 7 allows the current applied during resistance welding to be decreased, it becomes possible to avoid problems associated with the production of nonaqueous electrolyte secondary batteries having excellent load characteristics.

The increase in internal resistance in EXAMPLE 3 was 8 mΩ and was relatively high as compared to other EXAMPLES, although the increase was far smaller than that in COMPARATIVE EXAMPLE 1. The comparison of EXAMPLES 1 to 3 shows that the increase in internal resistance was suppressed by reducing the mean arithmetic roughness (Ra) of the inner face of the sidewall of the exterior case. It is assumed that when the mean arithmetic roughness (Ra) of the inner face of the sidewall of the exterior case is small, the inner face of the sidewall of the exterior case attains a sufficient area of contact with the second exposed portion of the negative electrode current collector that is disposed on the outermost periphery of the electrode assembly. The mean arithmetic roughness of the inner face of the sidewall of the exterior case, although not particularly limited, is preferably not more than 1.4 μm.

From the comparison of EXAMPLES 3 to 7, it has been shown that the increase in internal resistance was suppressed to a greater extent with increasing content of SiO in the negative electrode active material. There was no increase in internal resistance when the SiO content was 4 mass % and above. While a higher SiO content is more preferable in order to suppress the increase in internal resistance, the SiO content is preferably not more than 20 mass % in consideration of the balance with battery characteristics such as cycle characteristics. Thus, the SiO content is preferably not less than 4 mass % and not more than 20 mass %.

INDUSTRIAL APPLICABILITY

The present invention makes it possible to provide nonaqueous electrolyte secondary batteries which are resistant to a decrease in output, characteristics due to external vibrations or impacts, and thus has high industrial applicability.

REFERENCE SIGNS LIST

10 NONAQUEOUS ELECTROLYTE SECONDARY BATTERY
11 NEGATIVE ELECTRODE PLATE
11a FIRST EXPOSED PORTION OF NEGATIVE ELECTRODE CURRENT COLLECTOR
11b SECOND EXPOSED PORTION OF NEGATIVE ELECTRODE CURRENT COLLECTOR
11c NEGATIVE ELECTRODE ACTIVE MATERIAL LAYER
12a FIRST NEGATIVE ELECTRODE LEAD
12b SECOND NEGATIVE ELECTRODE LEAD
12c OVERLAPPED PORTION
13 POSITIVE ELECTRODE PLATE
14 POSITIVE ELECTRODE LEAD
15 SEPARATOR
16 ELECTRODE ASSEMBLY
16a HOLLOW
17 INSULATING PLATE
18 INSULATING PLATE
19 GASKET
20 SEALING MEMBER
21 EXTERIOR CASE
21a INNER FACE OF SIDEWALL OF EXTERIOR CASE

The invention claimed is:

1. A nonaqueous electrolyte secondary battery comprising:
an electrode assembly including a negative electrode plate and a positive electrode plate wound together via a separator, the negative electrode plate including a negative electrode current collector and a negative electrode active material layer disposed on the negative electrode current collector, the positive electrode plate including a positive electrode current collector and a positive electrode active material layer disposed on the positive electrode current collector;
a nonaqueous electrolyte;
a bottomed cylindrical exterior case accommodating the electrode assembly and the nonaqueous electrolyte; and
a sealing member sealing an open end of the exterior case, wherein
the negative electrode plate has a first exposed portion of the negative electrode current collector and a second exposed portion of the negative electrode current collector which are exposed from the negative electrode active material layer on a coiling start end and on a coiling finish end, respectively,
at least part of the second exposed portion of the negative electrode current collector is in contact with an inner face of a sidewall of the exterior case,
a first negative electrode lead and a second negative electrode lead are joined to the first exposed portion of the negative electrode current collector and to the second exposed portion of the negative electrode current collector, respectively,
the first negative electrode lead and the second negative electrode lead each lead out from one end face of the electrode assembly toward a bottom of the exterior case, and
the first negative electrode lead is joined to the bottom of, the exterior case, the second negative electrode lead is joined to the first negative electrode lead.

2. The nonaqueous electrolyte secondary battery according to claim 1, wherein the negative electrode active material layer comprises a graphite and a silicon material.

3. The nonaqueous electrolyte secondary battery according to claim 2, wherein the silicon, material is at least one selected from the group consisting of silicon, silicon oxides, silicon alloys, lithium silicon oxides and silicon composites.

4. The nonaqueous electrolyte secondary battery according to claim 3, wherein the silicon oxide is represented by the general formula $SiO_x$ ($0.5 \leq x < 1.6$).

5. The nonaqueous electrolyte secondary battery according to claim 3, wherein the silicon alloy is an alloy of silicon with at least one metal element selected from the group consisting of nickel, iron, copper, titanium, tungsten and molybdenum.

6. The nonaqueous electrolyte secondary battery according to claim 3, wherein the silicon composite comprises silicon and at least one of a carbon material and a lithium silicon oxide.

7. The nonaqueous electrolyte secondary battery according to claim 2, wherein the negative electrode active material layer includes the silicon material in an amount of not less than 4 mass % and not more than 20 mass % of the total mass of the graphite and the silicon material.

8. The nonaqueous electrolyte secondary battery according to claim 1, wherein the surface roughness Ra of the inner face of the sidewall of the exterior case is 0 μm to 1.4 μm inclusive.

* * * * *